(12) United States Patent
Liu et al.

(10) Patent No.: US 11,937,057 B2
(45) Date of Patent: Mar. 19, 2024

(54) FACE DETECTION GUIDED SOUND SOURCE LOCALIZATION PAN ANGLE POST PROCESSING FOR SMART CAMERA TALKER TRACKING AND FRAMING

(71) Applicant: HEWLETT-PACKARD DEVELOPMENT COMPANY, L.P., Spring, TX (US)

(72) Inventors: Yibo Liu, Boxbourough, MA (US); Peter L Chu, Lexington, MA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 71 days.

(21) Appl. No.: 17/812,771

(22) Filed: Jul. 15, 2022

(65) Prior Publication Data
US 2023/0025997 A1    Jan. 26, 2023

Related U.S. Application Data

(60) Provisional application No. 63/203,435, filed on Jul. 22, 2021.

(51) Int. Cl.
| | |
|---|---|
| *H04R 3/00* | (2006.01) |
| *G06V 10/70* | (2022.01) |
| *G06V 40/16* | (2022.01) |
| *H04N 23/611* | (2023.01) |
| *H04R 1/40* | (2006.01) |

(52) U.S. Cl.
CPC ............ *H04R 3/005* (2013.01); *G06V 10/70* (2022.01); *G06V 40/162* (2022.01); *G06V 40/166* (2022.01); *H04N 23/611* (2023.01); *H04R 1/406* (2013.01); *H04R 2201/403* (2013.01)

(58) Field of Classification Search
CPC .. H04R 3/005; H04R 1/406; H04R 2201/403; H04N 23/611; G06V 10/70
See application file for complete search history.

(56) References Cited

U.S. PATENT DOCUMENTS

2002/0101505 A1* 8/2002 Gutta ................ H04N 7/15
348/E7.083
2019/0007623 A1* 1/2019 Wang ................ H04N 7/147

OTHER PUBLICATIONS

"Analog Beamforming vs Digital Beamforming, difference between Analog Beamforming and Digital Beamforming", RF Wireless World, 7 pages. Retrieved from the Internet on Jun. 22, 2022. URL: https://www.rfwireless-world.com/Terminology/Analog-Beamforming-vs-Digital-Beamforming.html.

(Continued)

*Primary Examiner* — Kathleen V Nguyen
(74) *Attorney, Agent, or Firm* — Quarles & Brady LLP

(57) ABSTRACT

A videoconferencing system includes a camera acquiring image data and a microphone array acquiring audio data. Image data is used in conjunction with sound source localization (SSL) data to locate a talker depicted in the image data. SSL processes the audio data and determines SSL pan angle values indicative of an estimated direction of a sound. Columns of pixels in an image are associated with bins. A bin count is incremented for each SSL pan angle value of the audio data that falls within a given bin. A bounding box in the image data is determined that encompasses a face depicted in the image data. A range of pixels is determined for the bounding box, such as extending from a leftmost column to a rightmost column. The bin with the highest bin count that also overlaps a range of pixels for a bounding box is deemed to contain the talker.

20 Claims, 9 Drawing Sheets

(56) References Cited

OTHER PUBLICATIONS

"MIPI I3C and I3C Basic", Mipi Alliance, 9 pages. Retrieved from the Internet on Jun. 22, 2022. URL: https://www.mipi.org/specifications/i3c-sensor-specification.

Chaudhari, Qasim, "What is the Difference between Analog, Digital and Hybrid Beamforming?", Wireless Pi, 2022, 14 pgs. Retrieved from the Internet: URL: https://wirelesspi.com/what-is-the-difference-between-analog-digital-and-hybrid-beamforming/.

Delos, Peter, "Digital Beamforming Techniques for Phased Array Systems", Aerospace and Defense Applications Group, Jan. 25, 2017, 34 pgs. Retrieved from the Internet: URL: https://ez.analog.com/cfs-file/_key/communityserver-wikis-components-files/00-00-00-02-22/01_2D00_25_2D00_17BeamformingforPhasedArrayWebcast.pdf.

* cited by examiner

| 0 | 256 | 512 | 768 | 1024 | 1280 pixels |
| 0 | 24 | 48 | 72 | 96 | 120 degrees |
| -60 | -36 | -12 | 12 | 36 | 60 degrees |

FACE DETECTION GUIDED SOUND SOURCE LOCALIZATION PAN ANGLE POST PROCESSING FOR SMART CAMERA TALKER TRACKING AND FRAMING

PRIORITY

This application claims priority to, U.S. Provisional Patent Application No. 63/203,435, filed on Jul. 22, 2021, entitled "Face Detection Guided Sound Source Localization Pan Angle Post Processing for Smart Camera Talker Tracking and Framing", which is hereby incorporated by reference in its entirety.

BACKGROUND

In videoconferences, it is desirable to focus the camera on a speaker, rather than maintain a full room view. To aid in such focusing, sound source localization (SSL) is used to provide a direction or angle in which to focus the camera to capture the speaker. Various methods may be used to determine SSL angles. However, conference room acoustics, such as echoes, and the distance between the speaker and the microphone array can result in jitter in the determined SSL angles. Such jitter makes framing the speaker more challenging.

BRIEF DESCRIPTION OF THE DRAWINGS

For illustration, there are shown in the drawings certain examples described in the present disclosure. In the drawings, like numerals indicate like elements throughout. The full scope of the inventions disclosed herein are not limited to the precise arrangements, dimensions, and instruments shown. In the drawings.

DETAILED DESCRIPTION

Figure 1:
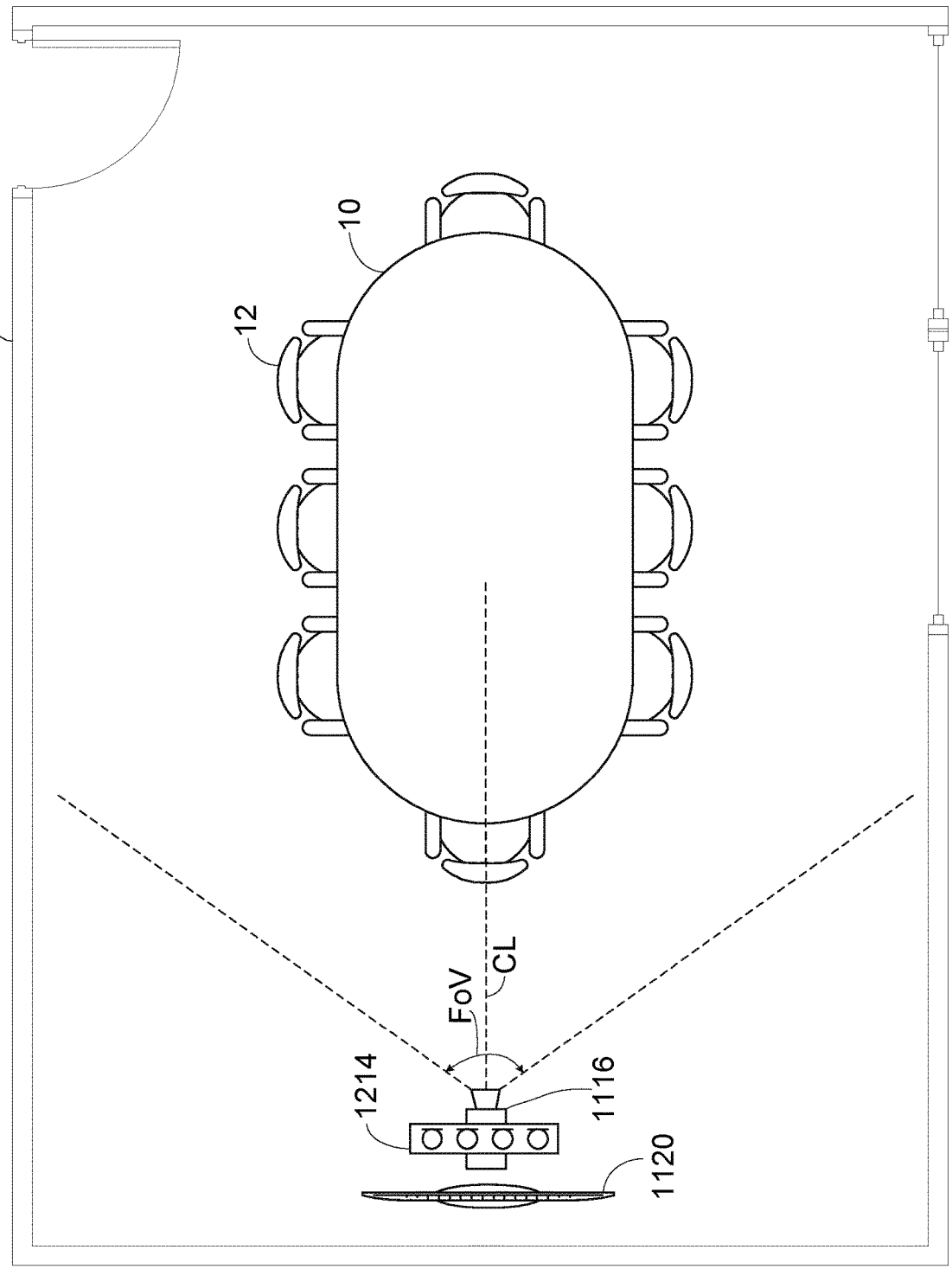
FIG. 1 is a top view illustration of a conference room containing a camera, a microphone array, a monitor, and desk and chairs, according to some implementations.

Sound source localization (SSL) is a process by which samples of audio data acquired by a microphone array are processed to determine the source location (e.g., SSL pan angle) of sound detected by the microphone array. Conference room acoustics and a distance between a speaker and the microphone array may lead to jitter in the SSL pan angle data. To provide more stable SSL pan angle data, the SSL pan angle data may be combined with image data. The more stable SSL pan angle data may then be used for improved framing of speakers during a videoconference.

A videoconferencing system may include one or more cameras acquiring image data and a microphone array acquiring audio data. The image data may be processed by a trained machine learning system to detect one or more features of individuals within a conference room. These features may include faces, heads, bodies, and so forth of the individuals. For example, in one embodiment, the trained machine learning system may output data illustrating faces of individuals in a conference room, where the faces are depicted as being within bounding boxes.

The microphone array acquires audio samples at predetermined rates. The audio samples are processed using SSL techniques to determine estimated SSL pan angles corresponding to one or more of a horizontal or vertical location associated with the audio samples. Framing that is based on these raw SSL pan angles may be unreliable due to various factors, such as echoes, a distance between a speaker and the microphone array, and so forth. A combination of SSL pan angle data and image data improves the determination of a final direction associated with sounds, such as the voice of one or more talkers tracked during a conference call.

To combine image data and SSL data, a relationship between pixels in an image and pan angle values associated with audio samples is established. Bins are generated to form this relationship. One or more columns or rows of pixels in an image are associated with bins. One or more SSL pan angle values are also associated with the same bins. For example, a pixel width of an image may be divided by the range of SSL pan angle values to determine a number of bins to use.

The SSL pan angles determined from the audio samples may be placed into the corresponding bins, such that a bin count is incremented for each SSL pan angle value that is placed within a bin. The processed image data provides bounding boxes where certain features, such as faces of users, are depicted within an image. The range of pixels associated with each bounding box is defined. For example, the range of pixels for a first bounding box may comprise a range from a particular left pixel column to a particular right pixel column.

A count of bin entries is tallied for the range of pixels associated with a bounding box. In one example, the total count or sum of bin entries associated with each bounding box is determined and the bounding box with the highest count of bin entries is deemed to be the talker or source of the sound detected by a microphone array. In another embodiment, other operations may be performed to determine the source of the sound using bounding boxes, such as by considering the average value of the bin entries for the bounding boxes, a bounding box having the highest overall number of bin entries for a pixel, and so forth.

Once the bounding box with the highest count of bin entries is identified, output data is generated to reflect the final source location of a sound. In one embodiment, the output data may represent the bounding box, a face, or a user. In another embodiment, the output data may represent a reference pixel associated with the bounding box having the largest count of bin entries, such as the center pixel of the bounding box. The output data is then utilized to determine a final source location of the sound, which may represent a final SSL pan angle value. This final source location data may then be used to provide framing of the talker during a videoconference.

By combining bounding box identification data with SSL pan angle data, the final SSL pan angle value used for framing is improved in a manner that removes jitter due to room acoustics and variations in distances to speakers. Particularly, by narrowing the options for SSL pan angle values to those that match a face or bounding box within the conference room, the final SSL angle value may be more accurate in representing actual talkers during a videoconference and better overall framing.

Referring now to FIG. 1, a conference room C configured for use in videoconferencing is illustrated. Conference room C includes a conference table 10 and a series of chairs 12. A camera 1116 is provided in the conference room C to view individuals seated in the various chairs 12. A monitor or television 1120 is provided to display the far end conference site or sites and generally to provide the loudspeaker output. The camera 1116 has a field-of-view (FoV) and an axis or centerline (CL). The camera 1116 includes a microphone array 1214 to be used to do SSL. The microphone array 1214 is centered on the camera 1116 centerline in some examples to simplify operation. In the layout of FIG. 1, the camera 1116 is positioned such that the camera 1116 has its CL centered on the length of the conference table 10.

Figure 2:
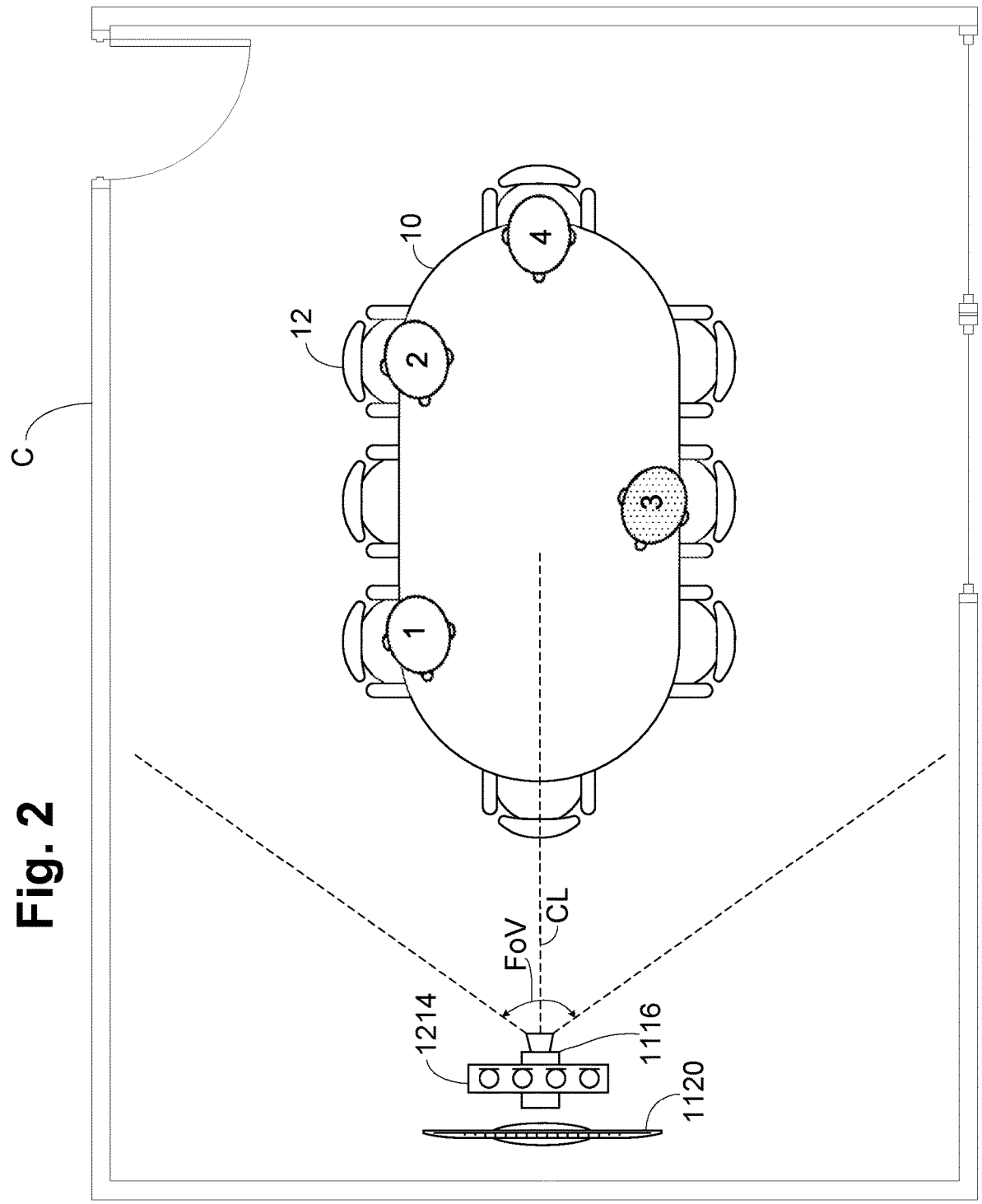
FIG. 2 is a top view illustration of the conference room of FIG. 1 with several individuals one of which is speaking, according to some implementations.

Turning now to FIG. 2, four individuals 1, 2, 3, and 4 are seated in various chairs 12. Individual 3 is speaking, as indicated by the shading of individual 3.

Figure 3:
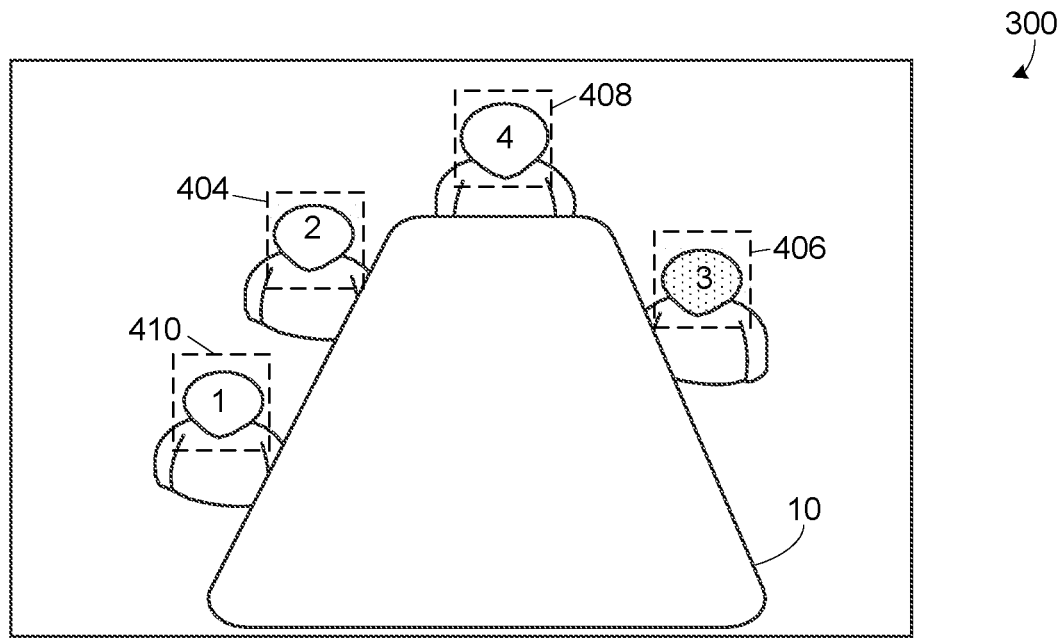
FIG. 3 is a camera view illustration of the conference room of FIG. 2, according to some implementations.

FIG. 3 illustrates a camera view 300 of the conference room C. Bounding boxes are illustrated for each individual 1-4. Bounding box 410 surrounds the face of individual 1, bounding box 404 surrounds the face of individual 2, bounding box 406 surrounds the face of individual 3, and bounding box 408 surrounds the face of individual 4. In some examples, the bounding boxes are developed by neural networks analyzing a video signal captured by the camera 1116. A trained machine learning system may analyze a video signal or an image to detect features of users depicted therein. In other examples, the trained machine learning system may detect features such as faces, heads, or bodies of users.

Figure 4:
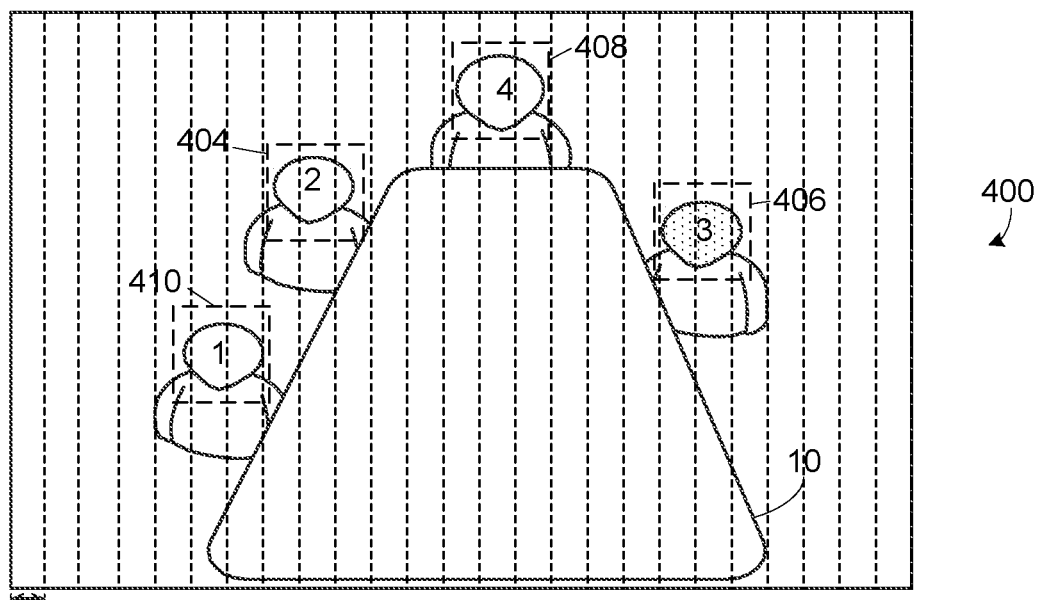
FIG. 4 is the camera view illustration of FIG. 3 with pixel boundaries indicated, according to some implementations.

FIG. 4 illustrates a view 400 which represents the camera view 300 of FIG. 3 overlaid with dashed lines representing selected pixel columns of a set of pixel number width of the conference room image captured by the camera 1116. View 400 shows selected pixel columns for clarity, with it being understood that the image may be comprised of many more pixel columns, such as 1280 pixel columns in a 720p image.

SSL pan angle values corresponding to the illustrated pixel values are shown both referenced from the left side of the image and referenced from the center of the image. For example, SSL pan angle values may range 120 degrees from the left side or 60 degrees in either direction from the center.

Bins 450 are used to relate the pixels in an image and SSL pan angle values. In particular, a bin 450 is associated with an individual pixel or a range of pixels in an image. As shown, an image may have 1280 pixels. A bin 450 may also be associated with a particular SSL pan angle or a range of SSL pan angle values. As shown, the SSL pan angles may range from 0 degrees to 120 degrees as shown left to right or may range from −60 degrees on the leftmost side to 0 degrees at the center and at 60 degrees at the rightmost side. In other examples, the SSL pan angle values may be represented using a different axis, such as when the SSL pan angle values represent vertical rows.

Once defined, bins 450 serve to relate particular pixels and particular SSL pan angle values with similar locations in the conference room. In some examples, the number of bins used may match the number of pixels used. In other examples, the number of bins may be determined by dividing a total number of pixels by the range of SSL pan angles. The bins 450, once established, may help relate the location of faces of users within a bounding box to possible SSL pan angle values that may represent an actual talker.

Figure 5:
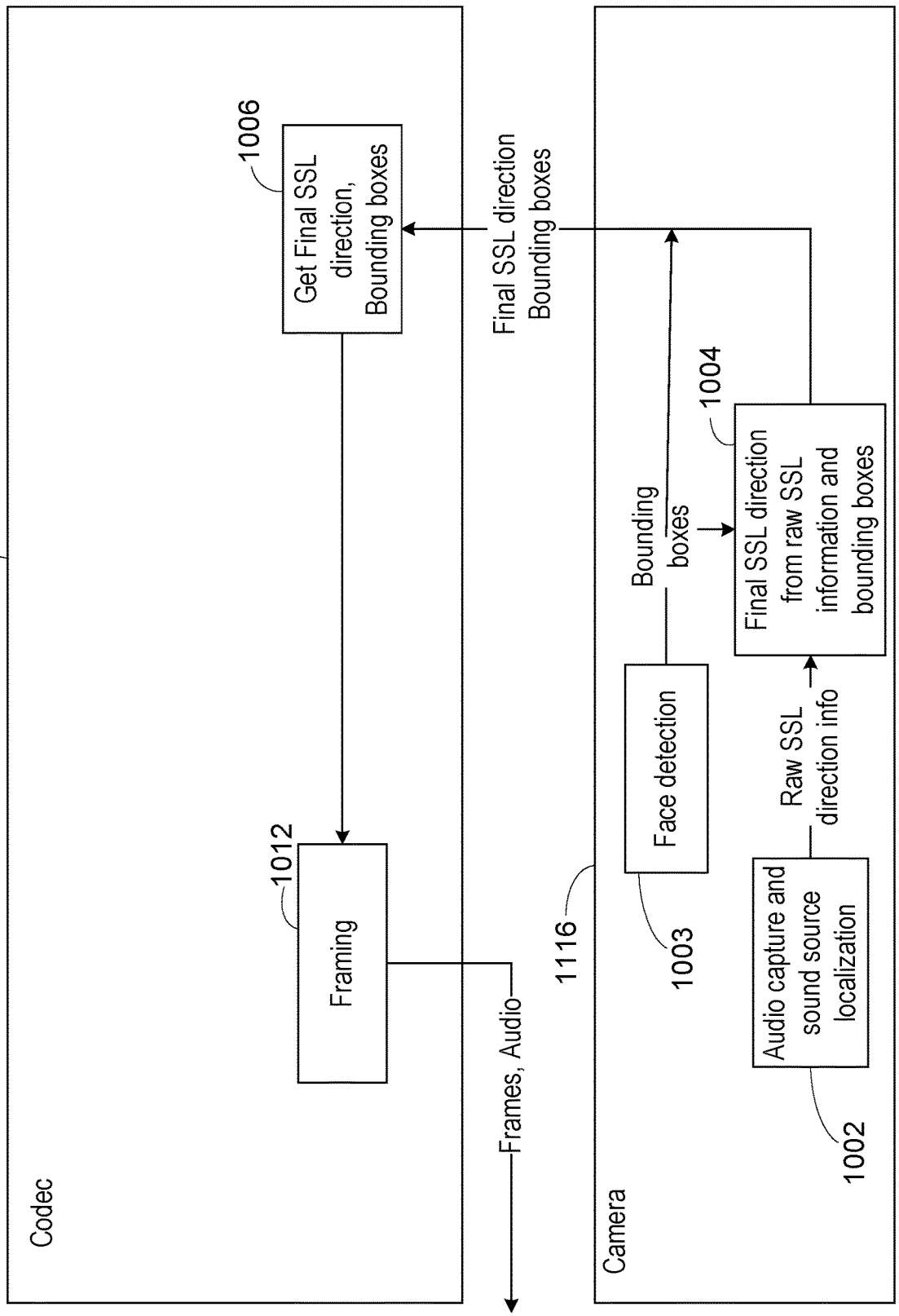
FIG. 5 is an illustration of division of operations between a codec and a camera with a microphone array, according to some implementations.

In the preferred example, the processing of the audio and video and the selection of a desired camera is split between the camera 1116 and a codec 1100. Referring to FIG. 5, the camera 1116 performs SSL in step 1002 based on sound received at the microphone array 1214 and provides raw SSL direction information, generally pan angle values. In some examples, the determined SSL direction limits are the same as the camera 1116 FOV. In step 1003, a camera image or video is inputted to a face detection module for processing to detect faces. This is preferably done using a neural network to provide a series of bounding boxes, one for each face. There are numerous variations of neural networks to perform face detection and provide bounding box outputs. The SSL direction information of step 1002 is combined with the bounding boxes provided by step 1003 to provide a final SSL direction or pan angle value. Step 1004 provides the SSL direction information and the bounding boxes to the codec 1100. Step 1004 is detailed in FIG. 6. The video stream from the camera 1116 is also provided to the codec 1100.

It is understood that the SSL determination and face detection are only performed periodically, not for every video frame. Face detection is performed once every one second to once every five seconds in some examples. This is satisfactory as the individuals' locations do not change much faster than those periods. SSL determinations are performed every 80 milliseconds (msec) to 200 msec in some examples, so that multiple SSL determinations are performed for each face detection.

In step 1006, the codec 1100 receives the final SSL direction information and the bounding boxes from the camera 1116. The final SSL direction information and the bounding boxes are provided to a framing step 1012. The framed video from the camera 1116 and the audio from the microphones 1114A and 1114B (shown in FIG. 7) connected to the codec 1100 are provided to the far end.

Figure 6:
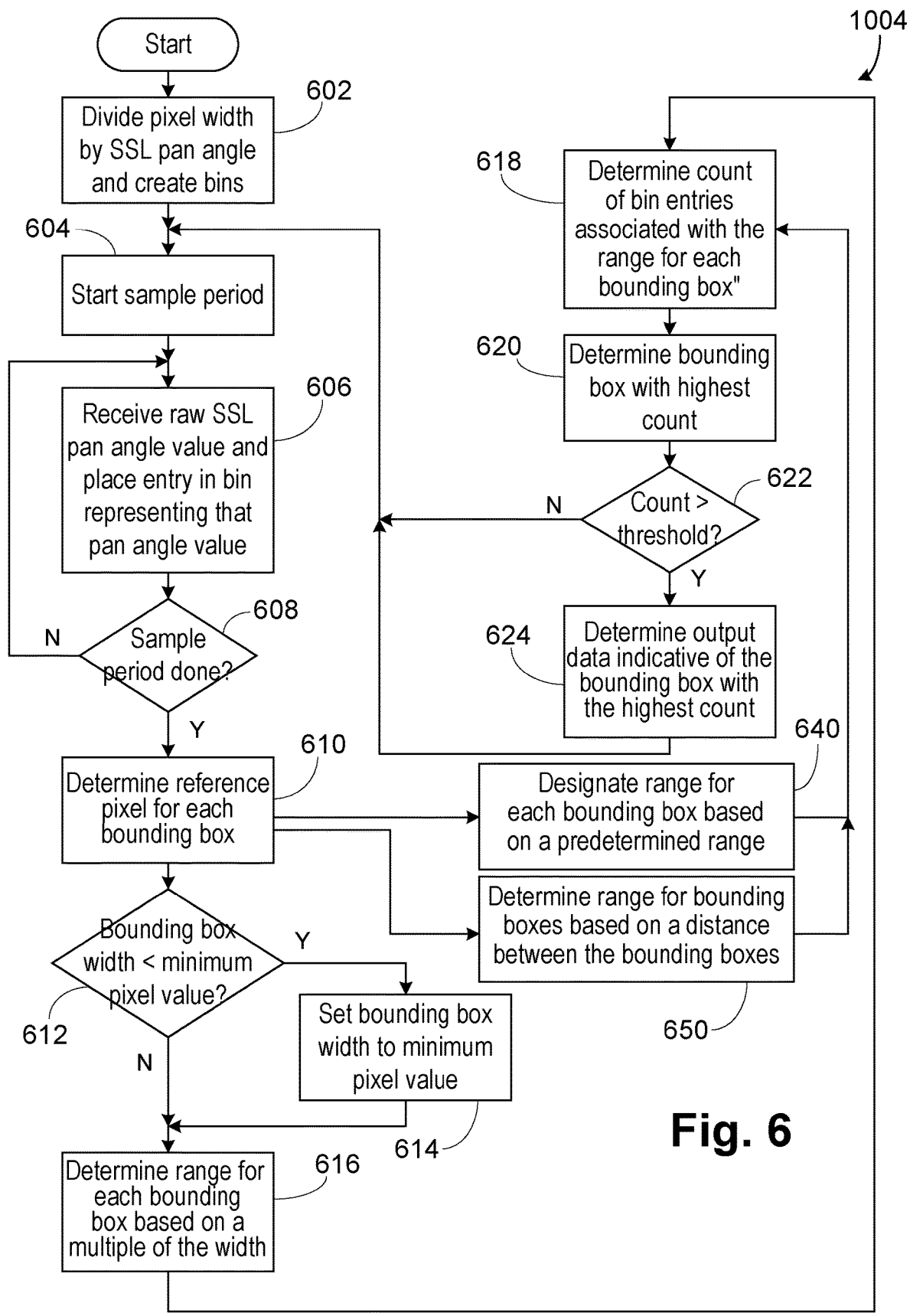
FIG. 6 is a flowchart for determining a final SSL angle using facial recognition data, according to some implementations.

FIG. 6 is a flowchart of the development of the final SSL direction information from the raw SSL direction information and the bounding boxes. At step 602, the bins are created. To do this, the pixel width of the camera image, such as 1280 for a 720p image, is divided by the SSL pan angle to correlate received raw SSL angle values to appropriate pixel values. Bins are created for each pixel, such as SSLHistory[N][1280], where N is the sample number and 1280 is the pixel width. In other embodiments, bins may be determined in an alternative manner, such as by setting the number of bins equal to the number of pixels or the number of pan angle values.

At step 604, a sample period is started. Various sample periods may be used, but one example is 2 seconds, which may match the face detection period and provides for 20 raw SSL angle sample values to be obtained if the SSL determinations are done every 100 msec. At step 606, a raw SSL pan angle value is received and correlated to the appropriate or corresponding bin(s). A bin entry is made in that appropriate bin, SSLHistory[N][1280], to represent the raw SSL pan angle value. At step 608, it is determined if the sample period is completed. If the sample period is not complete, the flow returns to step 606 to process the next raw SSL angle value.

If the sample period is done, a reference pixel value for each bounding box is determined at 610. In one embodiment, the reference pixel may represent a center pixel value, such as FaceCenterX[n], where n is zero based on the $n^{th}$ face. In other embodiments, the reference pixel may represent another pixel value, such as a top left or right corner pixel of the bounding box, a bottom left or right corner of the bounding box, and so forth. Thereafter, a range for each bounding box is determined, relative to the reference pixel for the bounding box. FIG. 6 shows three alternative ways to determine this range, either by performing steps 612-616, 640, or 650. In some cases, the range for each bounding box may be determined using the same set of steps (selected from 612-616, 640, or 650) or different bounding boxes may be determined using different steps.

At step 612, for each bounding box, it is determined if the bounding box width is less than a minimum pixel value. If so, the bounding box width value for that bounding box is set to the minimum pixel value at 614. After step 614, or if the bounding box width exceeds the minimum width in step 612, the width of the bounding box is multiplied by a multiple or factor at 616. The multiple or factor may be any integer number, such as 4, that is predetermined to provide a range of pixel values to examine for raw SSL value counts, such as FaceWiderX[n][L, R], for the left and right pixel values.

An alternative way to determine a range for a bounding box is step 640. At 640, a range for each bounding box may be determined based on a predetermined range. For example, a range of 40-50 pixels may be predetermined and designated for use for the bounding boxes. In that case, the range of pixels is set to 40-50 pixels with the center pixel of that range coinciding with the reference pixel for each bounding box.

In yet another alternative, the range for a bounding box may be determined using step 650. At 650, a range is determined for the bounding boxes based on a distance between two or more bounding boxes. For example, a distance between two bounding boxes may be determined in a scenario where two users represented by two bounding boxes are relatively close to each other. In such scenarios, the range for the two bounding boxes may be set to a smaller range to avoid overlap in the range of bounding boxes that could complicate a determination of a source of a sound to one of those two users. In other scenarios, if there are three or more bounding boxes detected and only two of those bounding boxes are close to each other, the range for the bounding box that is far apart from the other two may be determined using steps 612-616 or 640 and the range for the two bounding boxes that are close to each other may be determined using the distance between those two bounding boxes as in 650. Alternatively, the range for each bounding box may be calculated the same way for all the bounding boxes detected. In yet another scenario, an initial determination may be made to see if any bounding boxes are close to each other, and if so, all ranges for all bounding boxes would be determined using step 650. If none of the bounding boxes are close to each other, the ranges could be determined using either 612-614 as a default or 640 as a default.

After determining the range for the bounding boxes (using steps 612-616, 640, or 650), the process continues to step 618. At step 618, the bin entries for each pixel in the wider range for the bounding boxes are counted, to provide a total raw SSL location count for the enlarged bounding box area, such as FaceSSLHits[n]. For example, a total sum may be tallied for all the bin entries within the range for each bounding box. The total sum of bin entries for each bounding box may be calculated and compared to one another. In other embodiments, the average number of bin entries for each bounding box may be calculated and compared instead of the sum. In yet another example, a different operation may be performed using the bin entries, such as finding the median or mode of the bin entries within the bounding boxes.

At step 620, the bounding box with the highest count of bin entries is determined. The highest count of bin entries may be stored in a location such as FaceSSLHitsMax. At step 622, this highest count of bin entries is compared to a threshold value. In some embodiments, the threshold value may be set to 5 or other values.

By performing step 622, SSL pan angle values that are based on random noise or other factors not indicative of a speaker may be filtered out. If the highest count of bin entries is not greater than the threshold, operation returns to step 604 to start a new sampling period. By contrast, if the highest count is greater than the threshold, then the process continues to step 624. Of note, step 622 may be omitted in some embodiments.

At step 624, output data indicative of the bounding box with the highest count of bin entries is determined. In one embodiment, the output data may specify the bounding box that has the highest count of bin entries and provide that to the codec 1100. In other embodiments, the output data may specify a pixel location associated with the bounding box that has the highest count of bin entries. For example, the reference pixel value, such as the center pixel value, of the bounding box with the highest count of bin entries may be provided as the output data that is sent to the codec 1100. This reference pixel value may be deemed to be the final SSL direction. This final SSL direction represents a raw SSL pan angle value that coincides with the highest count of bins associated with a range for a bounding box that represents an actual user that is talking. After step 624, the operation returns to step 604.

Figure 7:
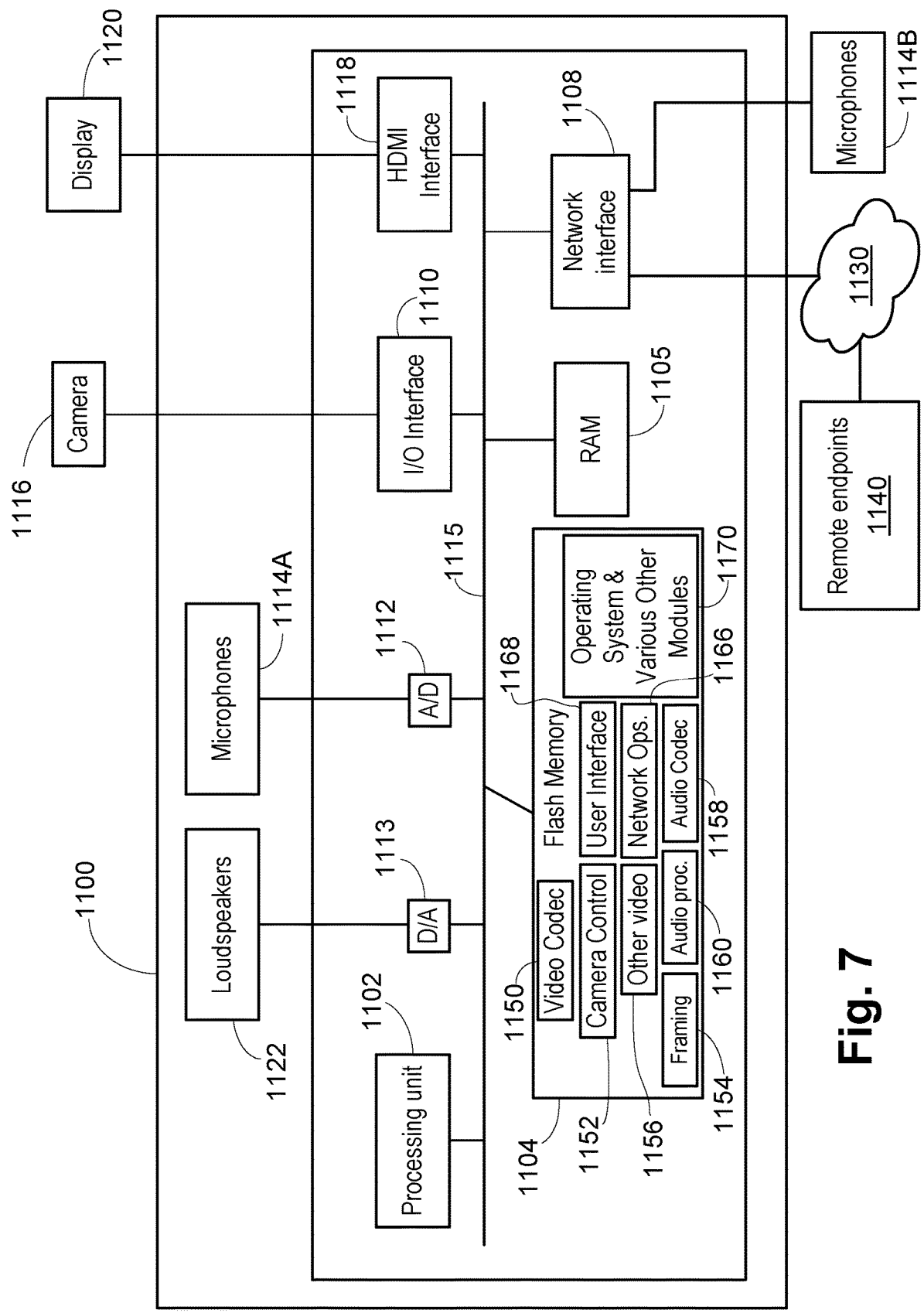
FIG. 7 is a block diagram of a codec, according to some implementations.

FIG. 7 illustrates aspects of a codec 1100 in accordance with an example of this disclosure. The codec 1100 may include a loudspeaker(s) 1122, though in many cases the loudspeaker 1122 is provided in the monitor 1120, and microphone(s) 1114A interfaced via interfaces to a bus 1115, the microphones 1114A through an analog to digital (A/D) converter 1112, and the loudspeaker 1122 through a digital to analog (D/A) converter 1113. The codec 1100 also includes a processing unit 1102, a network interface 1108, a flash memory 1104, RAM 1105, and an input/output (I/O) general interface 1110, all coupled by the bus 1115. The camera 1116 is illustrated as connected to the I/O interface 1110. Microphone(s) 1114B are connected to the network interface 1108. An HDMI interface 1118 is connected to the bus 1115 and to the external display or monitor 1120. The bus 1115 is illustrative and any interconnect between the elements can be used, such as Peripheral Component Interconnect Express (PCIe) links and switches, Universal Serial Bus (USB) links and hubs, or combinations thereof. The camera 1116 and microphones 1114A and 1114B may be contained in housings containing the other components or can be external and removable, connected by wired or wireless connections.

The processing unit 1102 can include digital signal processors (DSPs), central processing units (CPUs), graphics processing units (GPUs), dedicated hardware elements, such as neural network accelerators and hardware codecs, and the like in any desired combination.

The flash memory 1104 stores modules of varying functionality in the form of software and firmware, or generic programs, for controlling the codec 1100. Illustrated modules include a video codec 1150, camera control 1152, framing 1154, other video processing 1156, audio codec 1158, audio processing 1160, network operations 1166, user interface 1168, and operating system and various other modules 1170. The RAM 1105 is used for storing any of the modules in the flash memory 1104 when the module is executing, storing video images of video streams and audio samples of audio streams and can be used for scratchpad operation of the processing unit 1102.

The network interface 1108 enables communications between the codec 1100 and other devices and may be wired, wireless, or a combination thereof. In one example, the network interface 1108 is connected or coupled to the Internet 1130 to communicate with remote endpoints 1140 in a videoconference. In one or more examples, the general interface 1110 provides data transmission with local devices such as a keyboard, mouse, printer, projector, display, external loudspeakers, additional cameras, and microphone pods, etc.

In one example, the camera 1116 and the microphones 1114 capture video and audio, respectively, in the videoconference environment and produce video and audio streams or signals transmitted through the bus 1115 to the processing unit 1102. In at least one example of this disclosure, the processing unit 1102 processes the video and audio using algorithms in the modules stored in the flash memory 1104. Processed audio and video streams may be sent to and received from remote devices coupled to network interface 1108 and devices coupled to the general interface 1110. This is one example of the configuration of a codec 1100.

Figure 8:
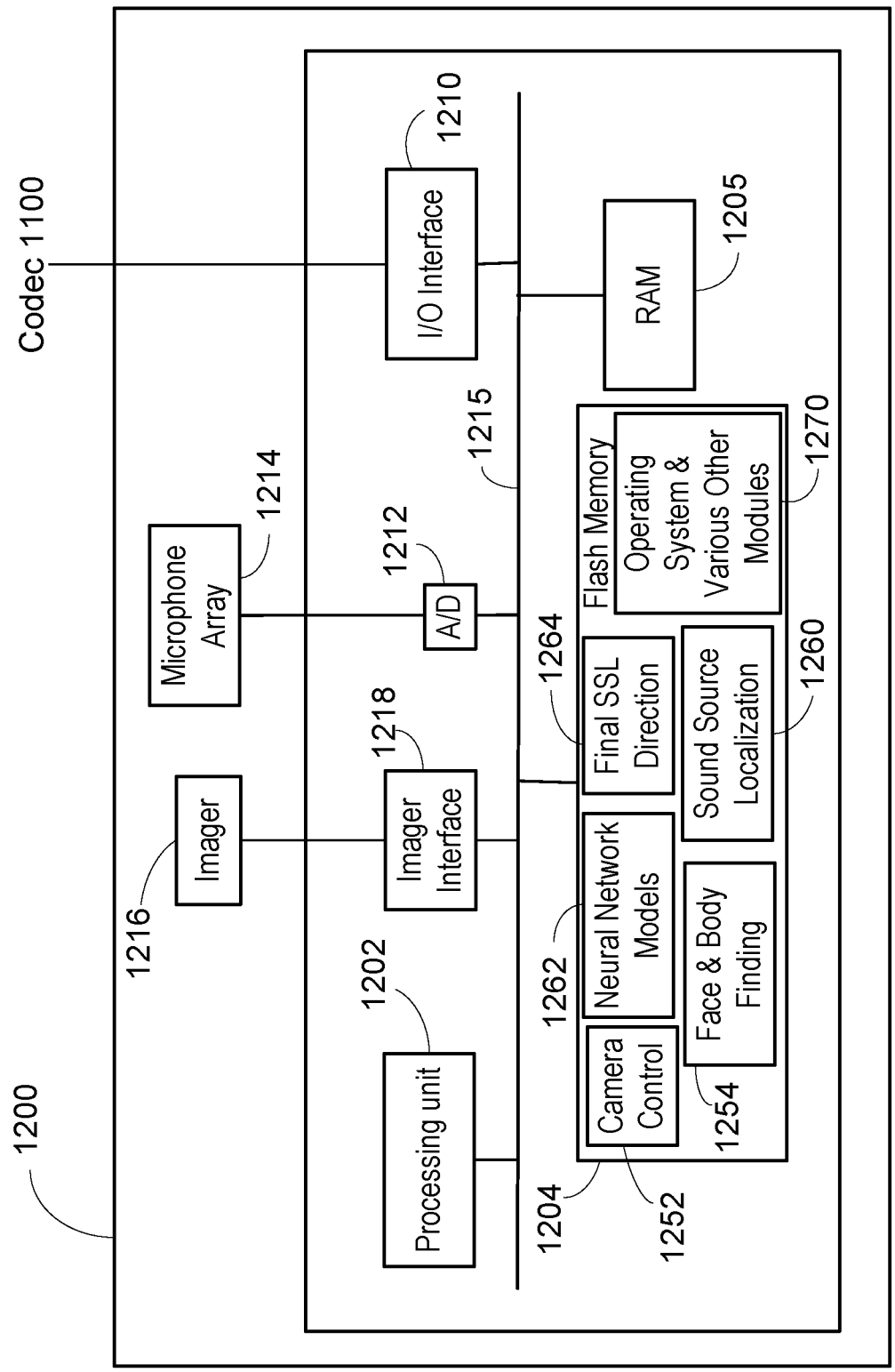
FIG. 8 is a block diagram of a camera, according to some implementations.

FIG. 8 illustrates aspects of a camera 1200, which may be camera 1116, in accordance with an example of this disclosure. The camera 1200 includes an imager or sensor 1216 and a microphone array 1214 interfaced via interfaces to a bus 1215, the microphone array 1214 through an analog to digital (A/D) converter 1212 and the imager 1216 through an imager interface 1218. The camera 1200 also includes a processing unit 1202, a flash memory 1204, RAM 1205, and an input/output general interface 1210, all coupled by the bus 1215. The bus 1215 is illustrative and any interconnect between the elements may be used, such as Peripheral Component Interconnect Express (PCIe) links and switches, Universal Serial Bus (USB) links and hubs, and combinations thereof. The codec 1100 is connected to the I/O interface 1210, preferably using a USB interface.

The processing unit 1202 may include digital signal processors (DSPs), central processing units (CPUs), graphics processing units (GPUs), dedicated hardware elements, such as neural network accelerators and hardware codecs, and the like in any desired combination.

The flash memory 1204 stores modules of varying functionality in the form of software and firmware, or generic programs, for controlling the camera 1200. Illustrated modules include camera control 1252, face and body finding 1254, sound source localization 1260, neural network models 1262, final SSL direction 1264, as in FIG. 6, and operating system and various other modules 1270. The RAM 1205 is used for storing any of the modules in the flash memory 1204 when the module is executing, storing video images of video streams and audio samples of audio streams, and may be used for scratchpad operation of the processing unit 1202.

In a second configuration, the cameras are simplified and the codec capabilities and processing are increased. In this second configuration, the neural networks operate on the codec instead of the cameras. The cameras provide their raw video streams to the codec, which then are analyzed using neural networks to find the bounding boxes, pose estimations, and key points developed by the cameras in the first configuration. In the second configuration the cameras still perform raw SSL and provide the raw SSL location information to the codec but the final SSL angle determination is performed in the codec. In a third configuration, the SSL is also performed by the codec, with the cameras providing the audio streams from each microphone. This third configuration allows for the simplest cameras, but at the expense of further increasing the processing requirements of the codec. The second configuration is a middle ground between the first and third configurations, requiring less processing from the codec but more processing in the cameras. The use of a particular configuration depends on component costs for the required performance levels.

Other configurations, with differing components and arrangement of components, are well known for both videoconferencing endpoints and for devices used in other manners.

Figure 9:
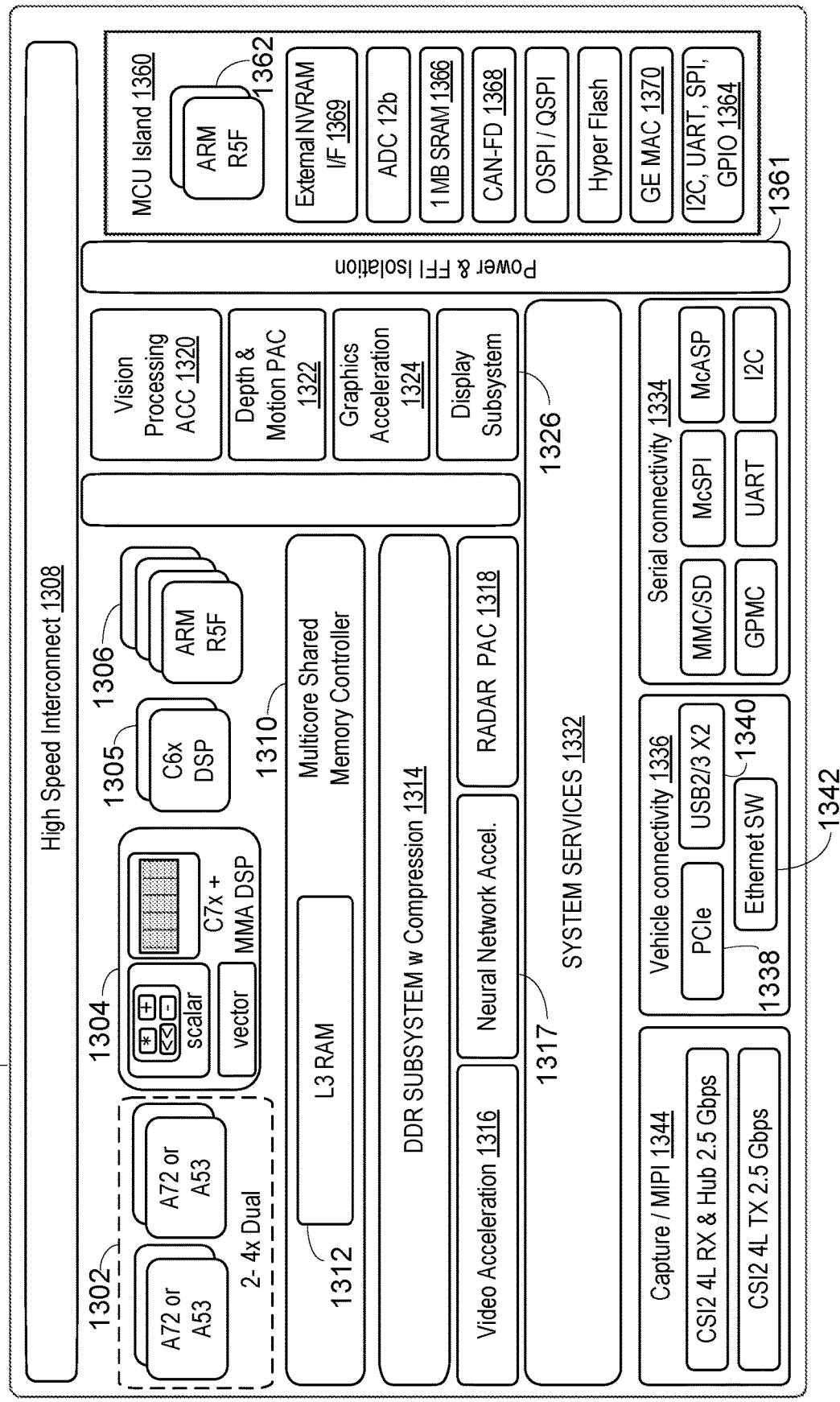
FIG. 9 is a block diagram of the processors, according to some implementations.

FIG. 9 is a block diagram of an exemplary system on a chip (SoC) 1300 that may be used as the processing unit 1102 or 1202. A series of more powerful microprocessors 1302, such as ARM A72 or A53 cores, form the primary general-purpose processing block of the SoC 1300, while a more powerful digital signal processor (DSP) 1304 and multiple less powerful DSPs 1305 provide specialized computing capabilities. A simpler processor 1306, such as ARM R5F cores, provides general control capability in the SoC 1300. The more powerful microprocessors 1302, more powerful DSP 1304, less powerful DSPs 1305, and simpler processor 1306 each include various data and instruction caches, such as L1I, L1D, and L2D, to improve speed of operations. A high-speed interconnect 1308 connects the microprocessors 1302, more powerful DSP 1304, simpler DSPs 1305, and processors 1306 to various other components in the SoC 1300. For example, a multicore shared memory controller 1310, which includes onboard memory or SRAM 1312, is connected to the high-speed interconnect 1308 to act as the onboard SRAM for the SoC 1300. A DDR (double data rate) memory controller system 1314 is connected to the high-speed interconnect 1308 and acts as an external interface to external DRAM memory. The RAM 1105 or 1205 are formed by the SRAM 1312 and external DRAM memory. A video acceleration module 1316 and a radar processing accelerator (PAC) module 1318 are similarly connected to the high-speed interconnect 1308. A neural network acceleration module 1317 is provided for hardware acceleration of neural network operations. A vision processing accelerator (VPACC) module 1320 is connected to the high-speed interconnect 1308, as is a depth and motion PAC (DMPAC) module 1322.

A graphics acceleration module 1324 is connected to the high-speed interconnect 1308. A display subsystem 1326 is connected to the high-speed interconnect 1308 to allow operation with and connection to various video monitors. A system services block 1332, which includes items such as direct memory access (DMA) controllers, memory management units, general-purpose I/O's, mailboxes and the like, is provided for normal SoC 1300 operation. A serial connectivity module 1334 is connected to the high-speed interconnect 1308 and includes modules as normal in an SoC. A vehicle connectivity module 1336 provides interconnects for external communication interfaces, such as PCIe block 1338, USB block 1340, and an Ethernet switch 1342. A capture/MIPI module 1344 includes a four-lane CSI-2 compliant transmit block and a four-lane CSI-2 receive module and hub.

An MCU island 1360 is provided as a secondary subsystem and handles operation of the integrated SoC 1300 when the other components are powered down to save energy. An MCU ARM processor 1362, such as one or more ARM R5F cores, operates as a master and is coupled to the high-speed interconnect 1308 through an isolation interface 1361. An MCU general purpose I/O (GPIO) block 1364 operates as a slave. An MCU RAM 1366 is provided to act as local memory for the MCU ARM processor 1362. A CAN bus block 1368, an additional external communication interface, is connected to allow operation with a conventional CAN bus environment in a vehicle. An Ethernet MAC (media access control) block 1370 is provided for further connectivity. External memory, generally non-volatile memory (NVM) such as flash memory 1104, is connected to the MCU ARM processor 1362 via an external memory interface 1369 to store instructions loaded into the various other memories for execution by the various appropriate processors. The MCU ARM processor 1362 operates as a safety processor, monitoring operations of the SoC 1300 to ensure proper operation of the SoC 1300.

It is understood that this is one example of an SoC provided for explanation and many other SoC examples are possible, with varying numbers of processors, DSPs, accelerators, and the like.

Figure 10:
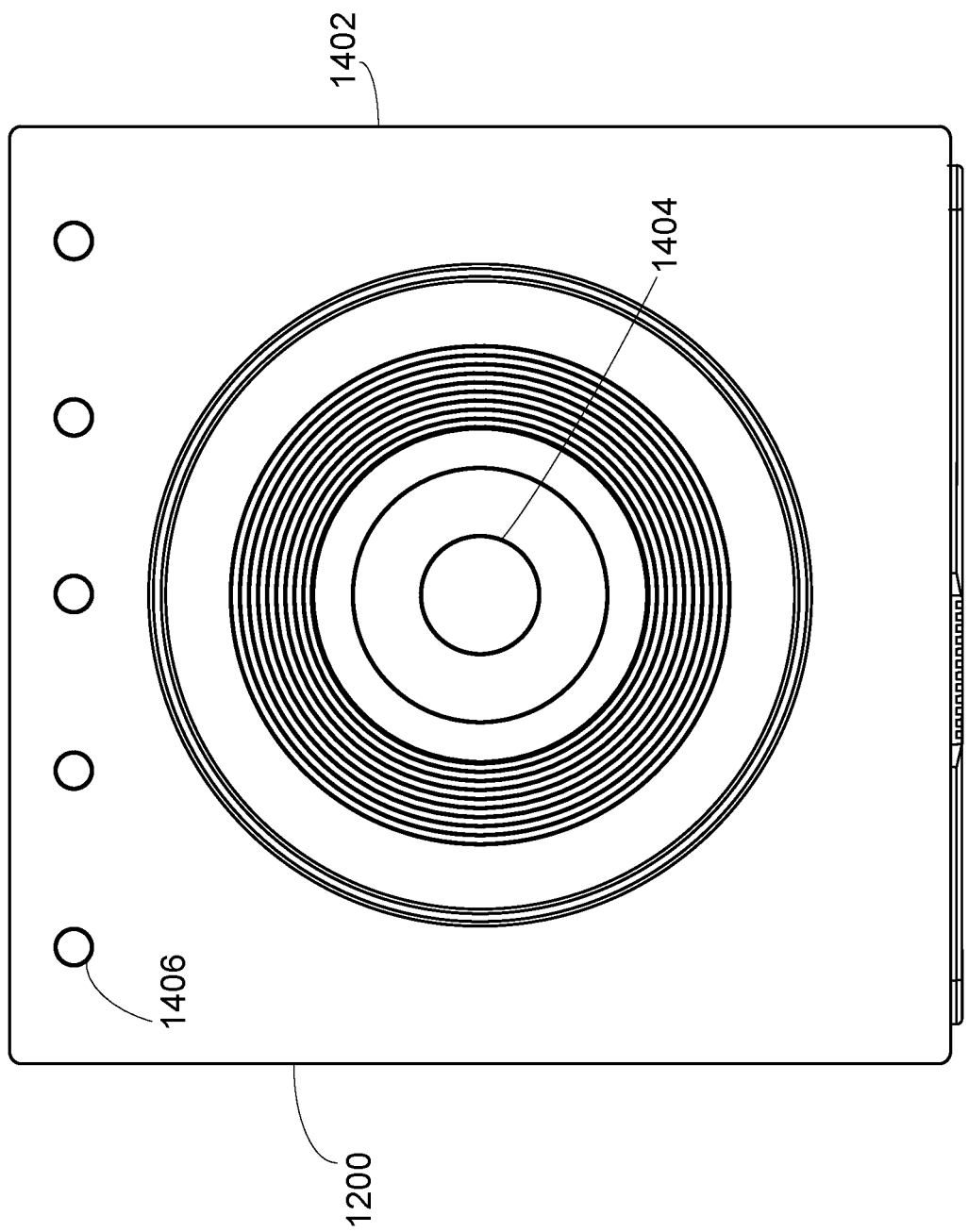
FIG. 10 is an illustration of the front view of a camera, according to some implementations.

FIG. 10 provides a front view of the camera 1200, such as camera 1116. The camera 1200 has a housing 1402 with a lens 1404 provided in the center to operate with the imager 1216. A series of five openings 1406 are provided as ports to the microphones in the microphone array 1214. It is noted that the microphone openings 1406 form a horizontal line to provide the desired angular determination for the SSL algorithm. In other embodiments, the microphone openings 1406 may form a vertical line or may form a combination of horizontal and vertical lines. This is an exemplary illustration of a camera 1200 and numerous other configurations are possible, with varying lens and microphone configurations.

While the above description has used a conference room as the exemplary environment, the environment can be any setting. It is understood that bins can be provided for groups of horizontal pixels, rather than each horizontal pixel as described above, depending on the number of pixels in the camera image and the desired resolution of the final SSL direction value. While bounding boxes are described above as representing the locations of faces of individuals, other parameters to provide face locations can be used. While faces have been used to determine individual location, other body parameters, such as upper torso or the like can be used instead of or in conjunction with faces.

By using raw SSL angle information in combination with a neural network to determine the locations of faces of individuals in the field-of-view of the camera, the location of the speaker from among a group of individuals has the SSL location provided as the center of the bounding box of the face. The use of the bounding box center removes jitter in SSL location values based on room acoustics or speaker distance from the microphone array. The removal of this jitter allows improved speaker framing.

The various examples described are provided by way of illustration and should not be construed to limit the scope of the disclosure. Various modifications and changes can be made to the principles and examples described herein without departing from the scope of the disclosure and without departing from the claims which follow.

What is claimed is:

1. A method comprising:
    acquiring an image using a camera (1116), wherein the image comprises pixels arranged in rows and columns;
    determining one or more bounding boxes (1003) corresponding to one or more faces depicted in the image;
    determining a plurality of bins (602) associated with the image, wherein each of the plurality of bins is associated with one or more of the columns;
    acquiring a plurality of audio samples (1002) using a microphone array (1214);
    determining sound source localization (SSL) pan angle values (1002) associated with one or more of the plurality of audio samples;
    determining, for respective SSL pan angle values (1002), one or more corresponding bins of the plurality of bins;
    incrementing a count of bin entries (606) for each of the one or more corresponding bins that is associated with each respective SSL pan angle value;
    determining, relative to each bounding box of the one or more bounding boxes, a first range (616, 640, 650), the first range indicative of pixels extending from a first column to a second column;
    determining, for the each bounding box, a sum of the count of bin entries (618) associated with the first range (616, 640, 650) for the each bounding box;
    determining, based on the sums of the count of bin entries (618) of the one or more bounding boxes, a first bounding box having a greatest sum (620); and
    determining output data (624) indicative of the first bounding box.

2. The method of claim 1, wherein the determining the plurality of bins (602) associated with the image comprises:
    determining a first pixel width of the image;
    determining a second range, wherein the second range includes a range of possible SSL pan angle values associated with output from the microphone array during operation; and
    dividing the first pixel width by the second range.

3. The method of claim 1, further comprising:
    processing the one or more of the plurality of audio samples (1002) using an SSL algorithm (1002) to determine the SSL pan angle values that are indicative of a direction of a sound.

4. The method of claim 1, further comprising:
    processing the image using a trained machine learning system (1003) to determine the one or more bounding boxes depicted in the image.

5. The method of claim 1, further comprising:
    determining a first width (610) of the first bounding box;
    determining the first width (610) of the first bounding box is less than a first value (612, 614), wherein the first value (612) is indicative of a minimum pixel value (612); and
    determining the first range (616) for the first bounding box by multiplying the first value (614) by a second value (616), wherein the second value is a predetermined value (616).

6. The method of claim 1, further comprising:
    determining a first width (610) of the first bounding box;
    determining the first width (610) of the first bounding box is greater than a first value (612, 616), the first value (612) is indicative of a minimum pixel value (612); and determining the first range (616) for the first bounding box by multiplying the first width (610) by a second value (616), wherein the second value is a predetermined value (616).

7. The method of claim 1, further comprising:
determining a reference pixel (610) for the first bounding box; and
designating a predetermined range of pixels (640), relative to the reference pixel, as the first range (640) for the first bounding box.

8. The method of claim 1, further comprising:
determining a distance (650) between two or more bounding boxes; and
determining the first range (650) for at least one of the two or more bounding boxes based on the distance (650) between the two or more bounding boxes.

9. The method of claim 1, further comprising:
determining that the sum of the count of bin entries (618) for the first bounding box is greater than a threshold value (622); and
sending the output data (624), responsive to the determining that the sum of the count of bin entries for the first bounding box is greater than the threshold value (622, 624).

10. The method of claim 1, further comprising:
determining a reference pixel (610) associated with the first bounding box; and
sending the output data (624), wherein the output data (624) is indicative of a direction associated with the reference pixel (624).

11. A system comprising:
a camera (1116);
a microphone array (1214);
a memory (1104, 1204) storing computer-executable instructions; and
a hardware processor (1102, 1202) coupled to the camera (1116) and the microphone array (1214), the hardware processor (1102, 1202) configured to execute the computer-executable instructions to:
  acquire an image (300) using the camera (1116), wherein the image (300) comprises pixels arranged in rows and columns (300, 400);
  determine one or more bounding boxes (404-410) corresponding to one or more users (1-4) depicted in the image (300);
  determine a plurality of bins (450) associated with the image (400), wherein each of the plurality of bins is associated with one or more of the columns (400);
  acquire a plurality of audio samples (1002) using the microphone array (1214);
  determine sound source localization (SSL) pan angle values (1002) associated with one or more of the plurality of audio samples (1002);
  determine, for respective SSL pan angle values (1002), one or more corresponding bins (450) of the plurality of bins (450);
  increment a count of bin entries (606) for each of the one or more corresponding bins (450) that is associated with each respective SSL pan angle value (606);
  determine a first range (616, 640, 650) for each bounding box of the one or more bounding boxes (404-410), the first range (616, 640, 650) indicative of pixels extending from a first column to a second column (400);
  determine, for the each bounding box, the count of bin entries (618) associated with the first range (616, 640, 650) for the each bounding box (404-410);
  determine a first bounding box (404-410) having a greatest count of entries (620); and
  determine output data (620) indicative of the first bounding box (404-410).

12. The system of claim 11, the computer-executable instructions to determine the plurality of bins associated with the image further comprising instructions to:
determine a first pixel width (400) of the image (300);
determine a second range (400), wherein the second range (400) includes a range of possible SSL pan angle values (400) associated with output (1002) from the microphone array (1214) during operation; and
divide (602) the first pixel width (400) by the second range (400).

13. The system of claim 11, the hardware processor further configured to execute the computer-executable instructions to:
process the image (300) using a trained machine learning system (1003) to determine the one or more bounding boxes (404-410) depicted in the image (300); and
process the one or more of the plurality of audio samples (1002) using an SSL algorithm (1002) to determine the SSL pan angle values (400) that are indicative of a direction of a sound.

14. The system of claim 11, the hardware processor further configured to execute the computer-executable instructions to:
determine the first range (616, 640, 650) for the first bounding box (404-410) by one of:
  multiplying (616) a first width (616) of the first bounding box (404-410) by a first value (616),
  using a predetermined range of pixels (640), or
  using a distance (650) between two or more of the bounding boxes (404-410).

15. The system of claim 11, the hardware processor further configured to execute the computer-executable instructions to:
send the output data (624), wherein the output data (624) is indicative of a direction associated with a user that is speaking (624, 1006, 1012).

16. A method comprising:
acquiring an image using a camera (1116), wherein the image comprises pixels arranged with respect to a first axis and a second axis;
determining one or more bounding boxes (1003) corresponding to one or more faces depicted in the image;
determining a plurality of bins (602) associated with the image, wherein each of the plurality of bins is associated with one or more pixels along the first axis of the image;
acquiring a plurality of audio samples (1002) using a microphone array (1214);
determining sound source localization (SSL) pan angle values associated with one or more of the plurality of audio samples (1002);
determining, for respective SSL pan angle values (1002), one or more corresponding bins of the plurality of bins;
incrementing a count of bin entries (606) for each of the one or more corresponding bins that is associated with each respective SSL pan angle value;
determining, relative to each bounding box of the one or more bounding boxes, a first range (616, 640, 650), the first range (616, 640, 650) indicative of pixels extending from a first pixel along the first axis to a second pixel along the first axis;

determining, for the each bounding box, the count of bin entries (618) associated with the first range (618) for the each bounding box;

determining a first bounding box having a greatest count of bin entries (620); and sending output data (624) associated with the first bounding box.

17. The method of claim 16, wherein:
the first axis specifies columns (1002), and
the second axis specifies rows (1002).

18. The method of claim 16, wherein:
the first axis specifies rows (1002), and
the second axis specifies columns (1002).

19. The method of claim 16, further comprising:

determining, for the each bounding box, a first value (618) associated with the count of bin entries that are associated with the first range (618) for the each bounding box;

determining, based on the first values (618), that the first bounding box has a greatest first value (620); and wherein the determining the first bounding box having the greatest count of bin entries (620) is based on the first bounding box having the greatest first value (620).

20. The method of claim 16, wherein the output data (624) is indicative of a final direction (1006) associated with a user that is speaking at a time the image is acquired and the plurality of audio samples are acquired.

* * * * *